United States Patent [19]
Miyasaka

[11] Patent Number: 5,918,991
[45] Date of Patent: Jul. 6, 1999

[54] PRINTING APPARATUS AND CONTROL METHOD FOR PITCH AND MOTION COMMANDS

[75] Inventor: Tomomi Miyasaka, Suwa, Japan

[73] Assignee: Seiko Epson Corporation, Tokyo, Japan

[21] Appl. No.: 08/820,436

[22] Filed: Mar. 12, 1997

[30] Foreign Application Priority Data

Mar. 12, 1996 [JP] Japan .................................. 8-055213

[51] Int. Cl.⁶ .................................................. B41J 19/32
[52] U.S. Cl. .......................... 400/303; 400/322; 400/903
[58] Field of Search ................... 400/9, 10, 61, 400/76, 279, 303, 304, 306, 320, 322, 903

[56] References Cited

U.S. PATENT DOCUMENTS

| | | | |
|---|---|---|---|
| 4,517,503 | 5/1985 | Lin | 400/322 |
| 4,522,517 | 6/1985 | Wade | 400/322 |
| 4,652,159 | 3/1987 | Nagai | 400/322 |
| 4,669,897 | 6/1987 | Asakura | 400/303 |
| 4,737,924 | 4/1988 | Miki | 400/303 |
| 4,741,634 | 5/1988 | Nozaki | 400/306 |

FOREIGN PATENT DOCUMENTS

| | | | |
|---|---|---|---|
| 0 227 609 | 7/1987 | European Pat. Off. | |
| 61-209169 | 9/1986 | Japan | 400/303 |
| 62-181169 | 8/1987 | Japan | |

*Primary Examiner*—Eugene Eickholt
*Attorney, Agent, or Firm*—Michael T. Gabrik

[57] ABSTRACT

A printing apparatus and control method facilitating the development of application software that can be used with different printers when the horizontal and vertical pitches of their respective mechanical transports vary. Based on a received base pitch calculation command, the printing apparatus calculates and stores a conversion coefficient for converting the minimum physical pitch values of the printer mechanism to virtual base pitch values. Thereafter, the printing apparatus executes motion commands and directs relative motion of the head and/or selected recording medium transport in accordance with this virtual pitch value.

13 Claims, 5 Drawing Sheets

PRINTING APPARATUS AND CONTROL METHOD FOR PITCH AND MOTION COMMANDS

BACKGROUND OF THE INVENTION

1. Field of the Invention

The present invention is directed to processor-controlled printing mechanism, and is particularly concerned with techniques for easing control software development across a range of printing apparatuses having varied pitch characteristics.

2. Description of the Related Art

In software-controlled serial or line printers, mechanical transports such as motor-activated gear trains are used to control print head and/or recording medium movement during recording operations. Typically, these mechanical transports only provide stepwise linear rather than continuous motion, so movement of the medium and/or print head is described in terms of a discrete series of mechanical steps. Each step refers to the minimum amount of relative movement or distance in a particular direction that can be accommodated by the transport mechanism(s). In terms of strictly horizontal and vertical movement, such steps are known as the horizontal and vertical pitch of the printer. Of course, since different printing applications may demand differing mechanical transports, these pitch values may vary significantly from printer to printer.

To control the mechanical transport and transport-dependent functions of such printers, such as line spacing, character spacing, etc. in an printed document or image, application software executing locally on a host machine issues one or more motion commands which can be received, interpreted and executed by the print controller mechanism. Recently, these motions commands have become standardized across a range of printer models, and take the form of a motion instruction followed by a factor "n". When received by the print controller, it executes the specified motion command for the relative distance specified by multiplying n by the appropriate minimum pitch defined for that particular printer.

Therefore, despite commonality in the syntax of the motion command, an applications programmer must still take into account differing minimum pitches of the printers they support in order to achieve similar relative motion results. This requires the applications programmer to limit the number of printers supported as well as tailor the n factors of the motion commands for each unique printer pitch value.

These selection and tailoring requirements cut against current software design trends such as code-reuse and hardware abstraction, which can appreciably shorten product development, reduce costs and improve software quality. Thus, the need to adapt application software for supporting printers having dissimilar pitch characteristics can be viewed as a significant design impediment.

OBJECT OF THE INVENTION

In consideration of the aforementioned problems, the object of the present invention is to eliminate the need to redevelop application software according to individual printer pitch specifications.

SUMMARY OF THE INVENTION

In accordance with this and related objects, a printing apparatus according to the present invention includes: a print controller responsive to motion commands issued locally in memory or remotely by a host information processor; a displacement unit for changing the relative position of the printer's print head and/or recording media loaded therein using a predetermined distance as the minimum mechanical displacement step; a base displacement generator for setting a base displacement step responsive to at least one of a set predetermined default pitch values or a predefined motion command received by the print controller; a conversion coefficient calculator for calculating one or more conversion coefficients between the minimum displacement step (pitch value) and the generated base displacement step; a relative motion translator for deriving the amount of relative movement specified in a received motion command between the print head and a selected recording medium based on the generated base displacement step; and a displacement controller for controlling the displacement unit based on the calculated conversion coefficient and the amount of relative movement derived by the relative motion translator.

According to the presently preferred embodiment, the aforementioned base displacement generator, conversion coefficient calculator, relative motion translator, and displacement controller all take the form of interdependent threads residing in printer memory and executed by the aforementioned print controller.

With the configuration of the preferred embodiment thus described, the minimum pitch values that can differ according to the printer model are converted locally by the print controller. Users developing application software accommodating different printer models can therefore provide the greatest compatibility with the least number of changes to the application software. In the conventional printers, setting the paper feed distance and specifying the print position using commands has been accomplished using the minimum pitch units specific to the printer mechanism. With the present invention, however, dependence on the printer mechanism is minimized (at least from the viewpoint of the applications software), and motion commands can be realized using inches or other standard units of measure.

Other objects and attainments together with a fuller understanding of the invention will become apparent and appreciated by referring to the following description of a particular embodiment and claims taken in conjunction with the accompanying drawings.

BRIEF DESCRIPTION OF THE DRAWINGS

In the drawings, wherein like reference symbols refer to like parts.

DETAILED DESCRIPTION OF THE PREFERRED EMBODIMENT

Figure 1:
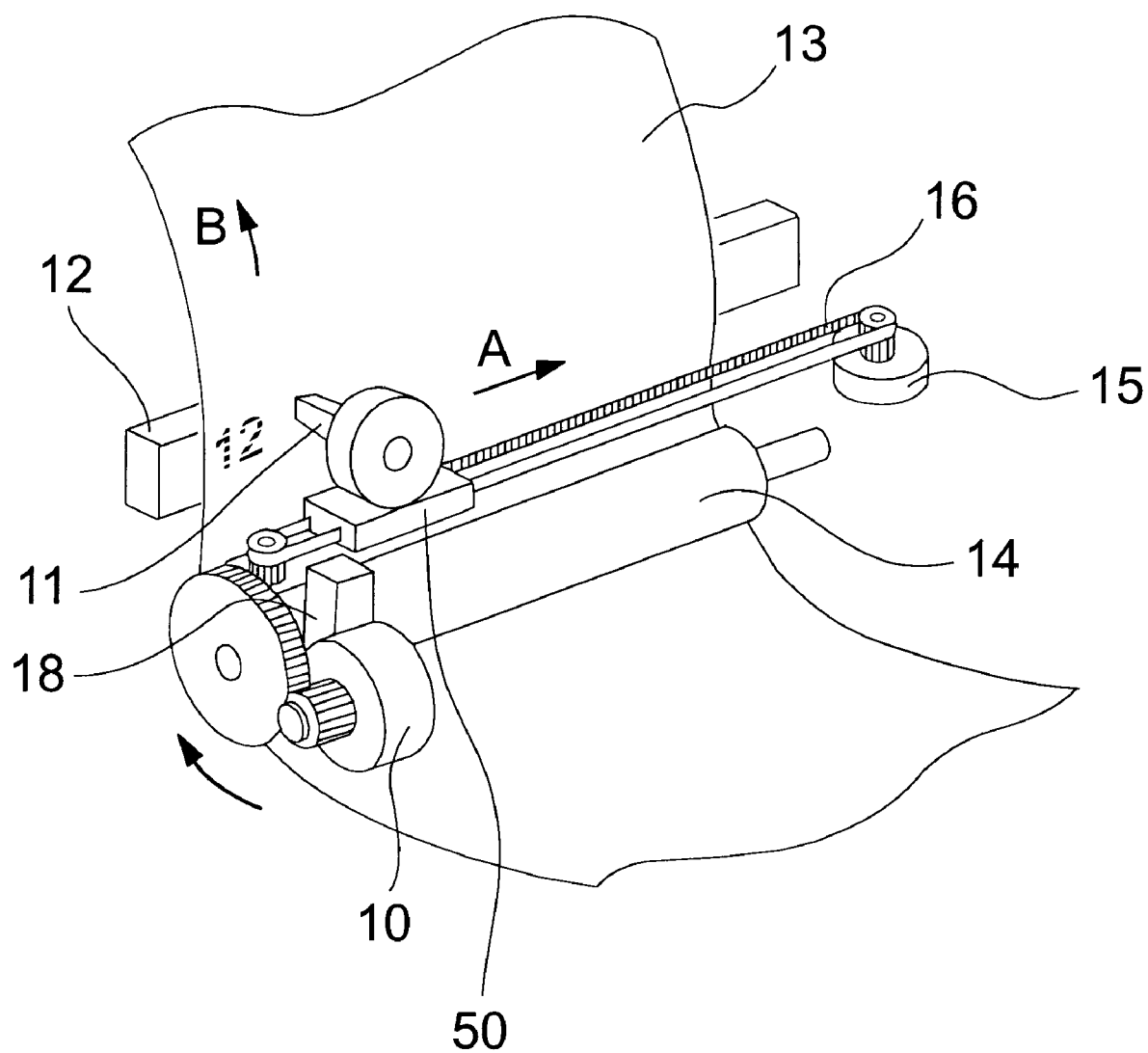
FIG. 1 is a simplified perspective view of the mechanical components comprising the printing apparatus according to the presently preferred embodiment of the invention.

The mechanical components of a printing apparatus according to the preferred embodiment of the invention are shown in FIG. 1. Referring to FIG. 1, stepping motor 10 is the paper feed drive source. The print head 11 is mounted on a carriage 50. The print head carriage 50 moves sequentially right and left by stepping motor 15 and belt 16 engaging stepping motor 15, and print head 11 is driven synchronized to the carriage movement to print desired text, symbols, and image markings. For simplicity of discussion hereinbelow, print head 11 is shown in FIG. 1 as printing while moving in the direction of arrow A.

Platen 12 is normally made from a hard material, and print head 11 prints to recording paper 13 against platen 12. When printing a particular line is completed by print head 11, paper feed stepping motor 10 is driven to rotate paper feed roller 14, thereby transporting recording paper 13 the distance of one line in the direction of arrow B, substantially perpendicular to the direction indicated by arrow A.

A photosensor with a built-in amplifier is used for print head home position detector 18. Home position detector 18 detects the home position of print head 11, and the output signal is used to determine whether carriage movement falls within accepted norms (i.e. there is nothing impeding the movement of the carriage).

Figure 2:
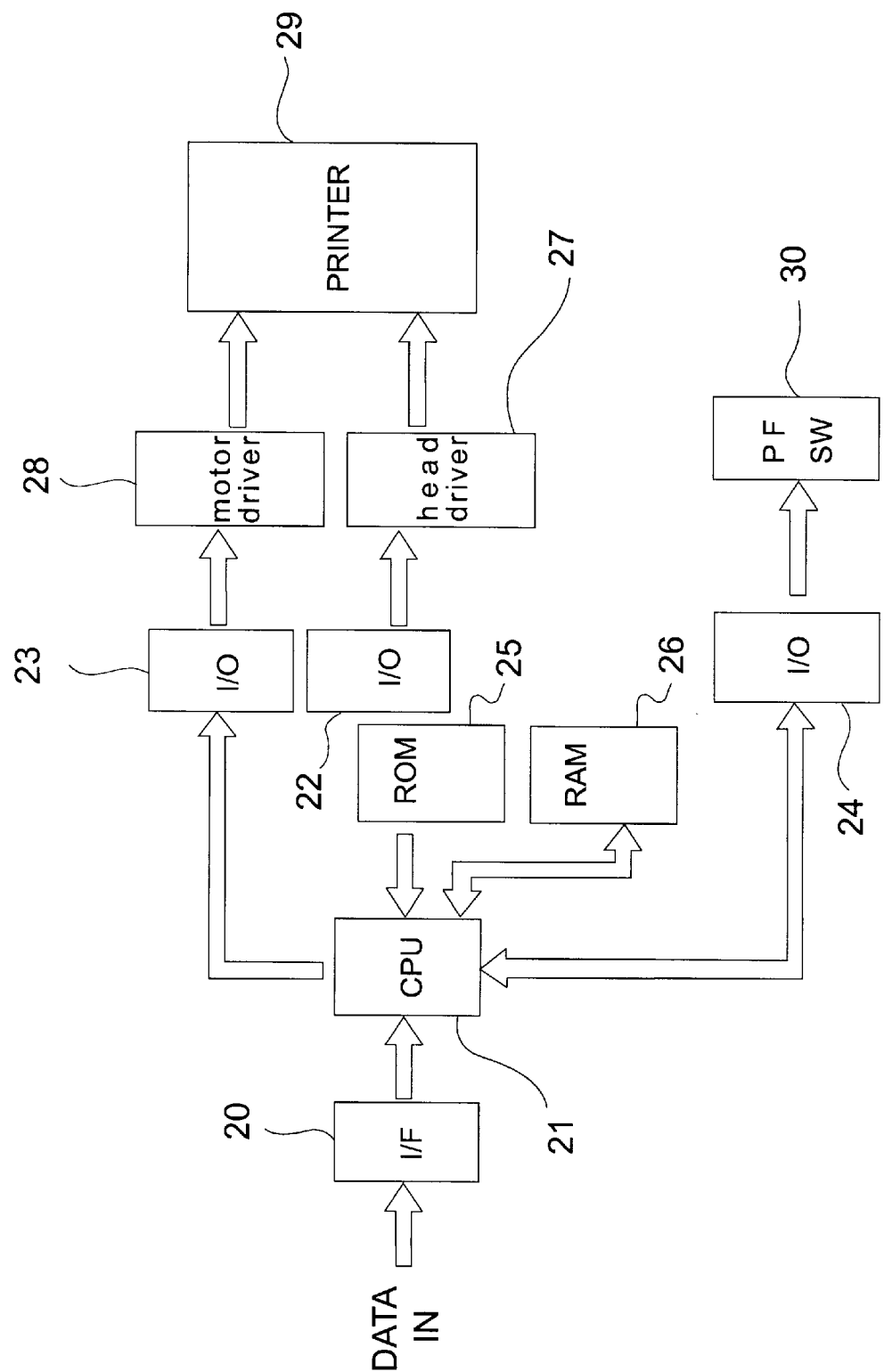
FIG. 2 is a block diagram of the control components of the printing apparatus shown in FIG. 1.

FIG. 2 is a simplified block diagram showing control components of the printing apparatus according to the preferred embodiment. Print data, comprising control commands and image/text data is received by interface 20 from an external source (not shown), such a host information processor executing printer compatible application software. The received print data is passed on to CPU 21 comprising the aforementioned print controller. In turn, the CPU 21 selectively decodes and manipulates information contained in this received print data in consultation to program statements and information provided in printer memory, comprising ROM 25 and RAM 26. Thereafter, CPU 21 issues appropriate signals to I/O ports 22, 23, and 24 coupled to head driver 27, motor driver 28, and paper feed switch 30. In turn, CPU 21 may receive status or error information from these devices through I/O ports 22–24, as is well-known in the art.

Motor driver 28 controls driving the motors inside printer mechanism 29, and head driver 27 controls driving the print head. Together, these units comprise the aforementioned displacement unit.

RAM 26 comprises both an input buffer to which print data is directly buffered, and a print buffer storing the image/text data converted to the dot data used to drive the print head.

Figure 2A:
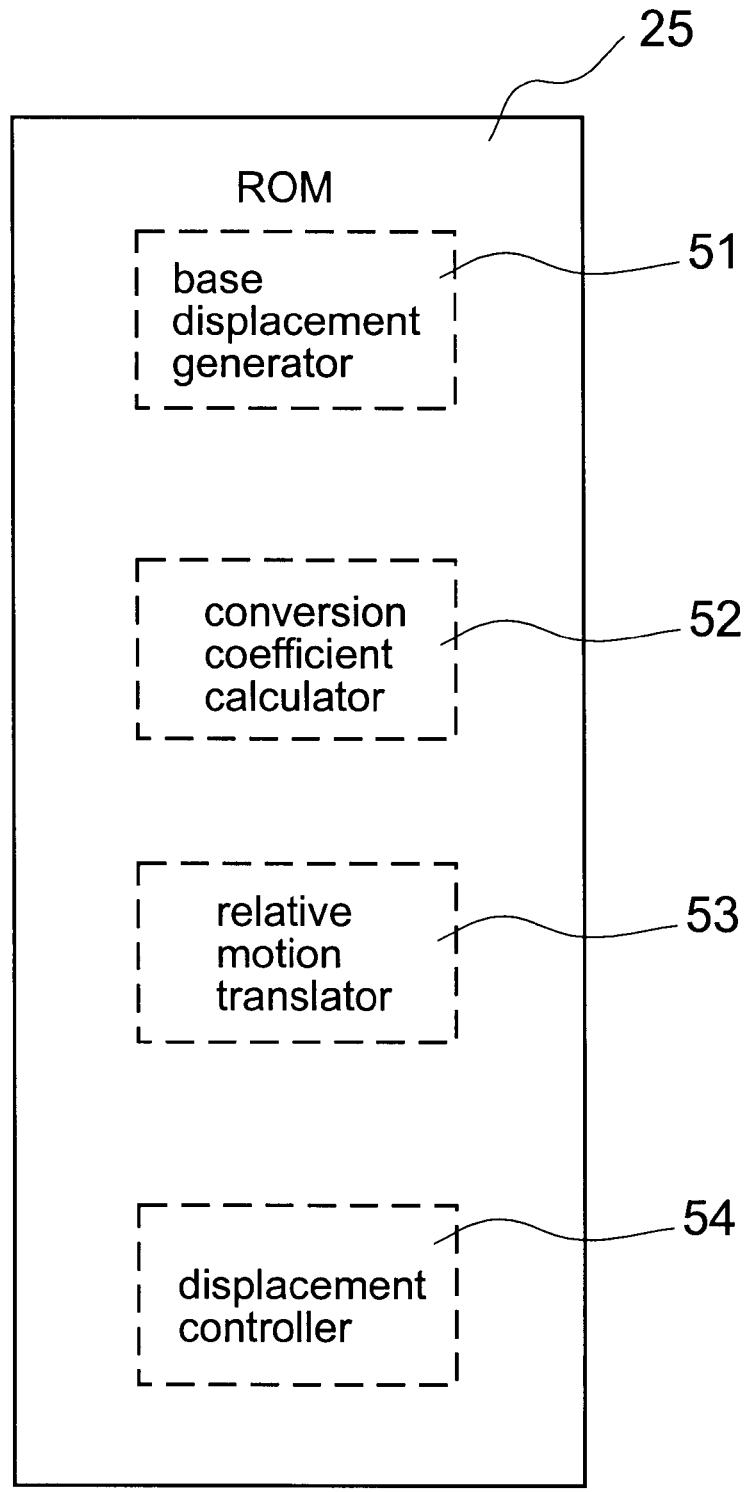
FIG. 2A is a more detailed block diagram of ROM 26 shown in FIG. 2.

In the preferred embodiment, CPU 21 controls overall printer operation in part through program statements representing the base displacement generator 51, conversion coefficient calculator 52, relative motion translator 53, and displacement controller 54 stored in ROM 25 (FIG. 2A). In addition to the program code, ROM 25 also stores a character generator that converts the character codes to character image data. In general, CPU 21 reads special control codes from the character strings in print data received by interface 20, interprets the commands, and controls printer operation according to those commands to print.

Moreover, in this particular embodiment, the aforementioned base displacement generator 51, conversion coefficient calculator 52, relative motion translator 53 and displacement controller 54 reside in ROM 26. However, it should become apparent to those ordinarily skilled in the relevant art that the particular storage medium in which they reside is germane to the teachings of the invention. For example, code statements representing base displacement generator 51, conversion coefficient calculator 52, relative motion translator 53, displacement controller 54 could easily be incorporated into RAM 25, or one or more EPROM, EEPROM, Flash EEPROM, any type of disk media including floppy disks, optical disks, CD-ROMs, magneto-optical disks, hard drives or disk arrays, whether located physically within or external to the printing apparatus, as well those residing on a network that the printing apparatus is in communication with. In essence, the storage medium or media retaining these program code statements can comprise any type of media suitable for storing computer readable instructions.

Still referring to FIG. 2, paper feed switch 30 is generally provided in the operating panel on the outside of the printer in the finished product. When paper feed switch 30 is operated, the appropriate signals are input through I/O port 24 to CPU 21.

Printer control according to the presently preferred embodiment of the invention includes base displacement step determination by the base displacement generator. This base displacement step, also referred to herein as a calculated base pitch, is used to standardize the paper feed distance, which can differ in different printer models depending upon the printer transport mechanism utilized. A flowchart detailing base displacement step determination is illustrated in FIG. 3 and described in more detail hereinbelow.

Note that it is assumed in the following description that all of the different printer models contemplated in the present embodiment are controlled using the same command set input through interface 20 from an external host information processor (not shown). This makes it possible to use the same device driver or application software to drive different printers by using the control commands of this command set.

The base displacement step or calculated base pitch noted above is a virtual minimum pitch that is defined by the software and used in place of the minimum pitch of the printer mechanism. The command specifying this base displacement step setting is defined as GS P n1 n2 where GS and P are control codes, and n1 and n2 are variables. In this embodiment, this command is issued by applications software executing on the host information processor.

Figure 3:
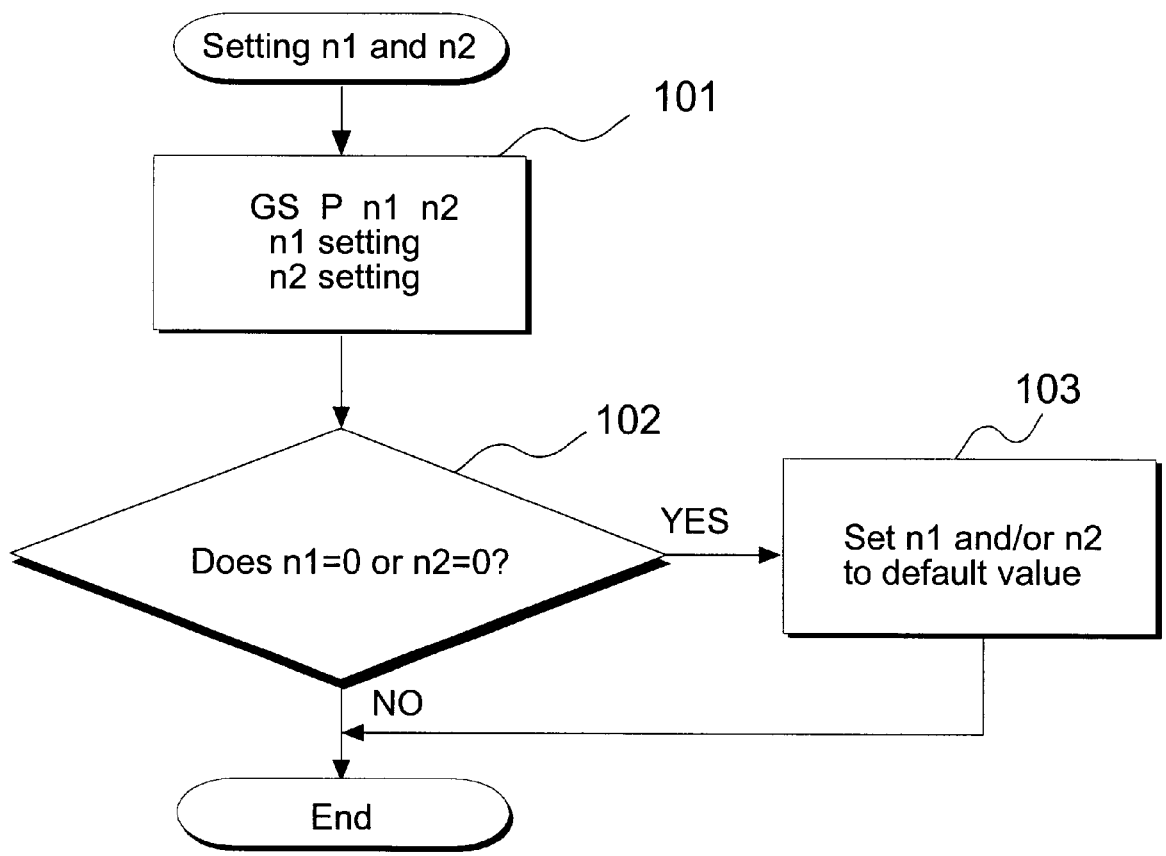
FIG. 3 is a flowchart illustrating base displacement step determination according to the preferred embodiment of the invention.

Referring to FIG. 3, in step 101, variables n1 and n2 are set by the applications program according to the printer specifications. Note here that n1 is the variable used to convert the horizontal pitch, and n2 is the variable used to convert the vertical (line) feed pitch. These variables are by default initialized to values corresponding to the specific minimum pitch values of the printer. For example, if the minimum horizontal pitch of the printer is $\frac{1}{150}$ inch and the minimum vertical pitch of the printer is $\frac{1}{144}$ inch, then n1=150 and n2=144 are the default values.

In addition to the base pitch setting command described hereinabove or as an alternative, the printing apparatus may be provided with localized setting instrumentation allowing a user set base pitch (actually the variables n1, n2) via the printer control console, a DIP switch etc. In this case, there is no requirement for the application software to send the base pitch setting command, although the print controller may override DIP settings when receiving a base pitch setting command, or vice versa, as will be appreciate by those ordinarily skilled in the art.

In step 102, a determination is made by the print controller (CPU 21) whether the applications program has set either one of the variables to zero. Because these settings are deemed invalid, those variables set to zero are reset to the default values in step 103. If variables are set to the default values, the printer mechanism is controlled to operate with the minimum horizontal pitch of $1/150$ inch and the minimum vertical pitch of $1/144$ inch. If for example, n2 is set to 240 and n1 specifies the default, the printer mechanism is controlled to operate with a minimum horizontal pitch of $1/150$ inch and a minimum vertical pitch of $1/240$ inch. Because these values are specific to the printer mechanism, the minimum pitch values may, of course, differ. To adjust for such differences between printers, the settings for the paper feed distance and the carriage feed distance must be changed according to the printer mechanism.

Therefore, if base displacement step calculation is executed during printer initialization, for example, the paper feed distance and character print position can thereafter be considered in inch units when executing control commands related to the pitch, and it is not necessary to consider the specific minimum pitch values of the printer mechanism when the applications program, host information processor or user issues a motion command to the printing apparatus.

Next, conversion coefficient calculation and relative motion translation will be described hereinbelow with reference to FIG. 3A. It is assumed in this embodiment that base step determination described hereinabove has already been executed by CPU 21.

Figure 3A:
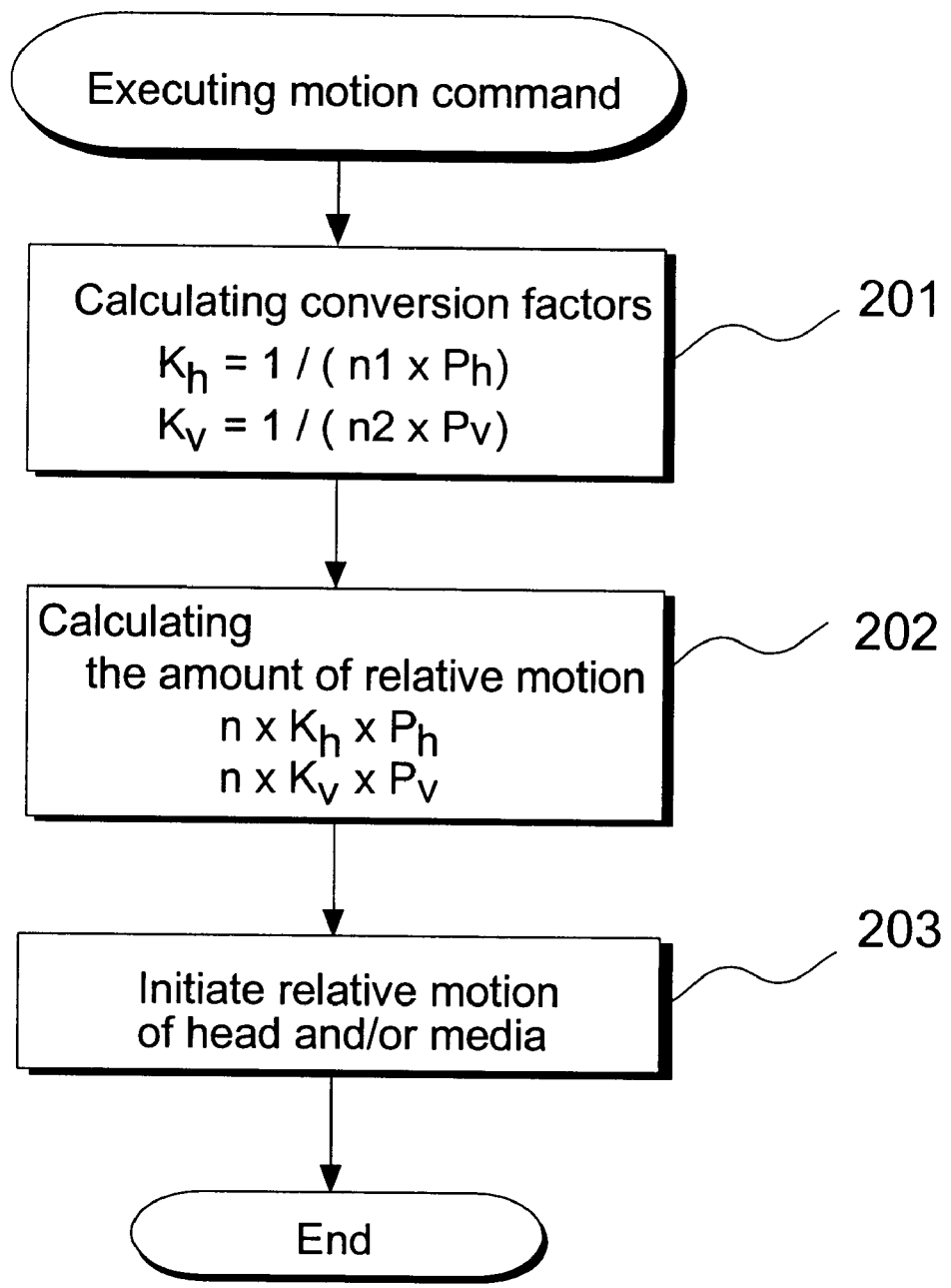
FIG. 3A is a flowchart illustrating minimum to base conversion coefficient calculation and relative motion translation according to the preferred embodiment of the invention.

When a motion command is received and decoded by CPU 21, control passes to step 201 shown in FIG. 3A. Step 201 represents conversion coefficient calculation according to the preferred embodiment, and involves calculating the horizontal ($K_h$) and vertical $K_v$ according to the following formulas:

$K_h=1/(n1 *P_h)$, where $P_h$ is the minimum horizontal pitch specific to the printer $K_v=1/(n1 *P_v)$, where $P_v$ is the minimum vertical pitch specific to the printer Control thereafter passes to step 202, as shown in FIG. 3A. Step 202 represents relative motion translation according to the preferred embodiment, and involves calculating the degree of relative print head motion specified in the motion command:

$M_h$ horizontal relative motion=$n*K_h*P_h$ $M_v$ vertical relative motion=$n*K_v*P_v$ Control thereafter passes to step 203, as shown in FIG. 3A. Step 203 represents displacement control according to the preferred embodiment, and involves CPU 21 generating appropriate motion signals to at least one of I/O units 22 and 23 for driving recording head 11 or advancing selected recording medium 13 through driving motor 10. Other than substitution of the Mh and Mv relative motion data calculated by the relative motion translator of the preferred embodiment for conventional motion parameters, displacement control is achieved through known techniques. Accordingly, further detail thereof is omitted hereinbelow.

The synergy between the base displacement generator 51, the conversion coefficient calculator 52, and the relative motion translator 53 according to the preferred embodiment of the invention may be best illustrated with reference to the following two examples.

In the first example, an application program directs two printers, A and B having different vertical pitch values to set the same line feed distance. More particularly, it is assumed that printer A has a minimum vertical pitch of $1/144$ inch, and printer B has a minimum vertical pitch of $1/240$ inch. Using the line feed setting command "ESC 3 n", it is possible to set the line feed distance of each printer to be the same. Note that ESC and 3 are control codes, and n is a user-defined variable.

The minimum pitch (specifically the paper feed distance of one step of the paper feed stepping motor in this example) of the printer mechanisms is known for both printers A and B, and the number of rotational steps of the stepping motor required to achieve a standard paper feed distance is calculated from this known minimum pitch value and the paper feed distance specified by the control command. The stepping motor is then driven the calculated number of steps corresponding to the line feed command to advance the recording paper.

If the virtual (calculated) base pitch is equal to the default setting and the line feed setting command (control code) "ESC 3 (48)" is issued to printers A and B, a the line feed distance of each printer will be as follows:

Printer A: $48\times(1/144)=1/3$ inch,

Printer B: $48\times(1/240)=1/5$ inch.

The feed pitch when the base pitch calculation command GS P n1 n2 is used to change the calculated base pitch is described next. When the base pitch calculation command "GS P (0) (720)" is received, the print controllers of printer A and printer B calculate a conversion coefficient as follows.

The specific minimum pitch $P_{vA}$ of printer A is $1/144$ inch. As a result the conversion coefficient $K_{vA}$ is:

$K_{vA}=1/(n2 \times P_{vA})=144/720=1/5$.

The specific minimum pitch $P_{vB}$ of printer B is $1/240$ inch. As a result the conversion coefficient $K_{vB}$ is:

$K_{vB}=1/(n2 \times P_{vB})=240/720=1/3$.

The line feed setting command "ESC 3 (144)" is then executed, resulting in the following line feed settings:

Printer A: $n\times K_{vA}\times P_{vA}=144/(5\times144)=1/5$ inch

Printer B: $n\times K_{vB}\times P_{vB}=144/(3\times240)=1/5$ inch.

As a result, the line feed distance of both printers A and B is $1/5$ inch. It should be particularly noted here that $(n\times K_{vA})$ and $(n\times K_{vB})$ express the drive pulse count of the stepping motor 10 for the line feed operation. Because the line feed pitch is thus calculated using the base pitch calculation command, differences in the printer mechanism do not affect the result of executing the line feed setting command "ESC 3 n".

In the second example, printers C and D are directed by an applications program to set the same character spacing. Here, the minimum pitch values are as follows:

Printer C: $P_{hC}=160$, $P_{vC}=144$

Printer D: $P_{hD}=360$, $P_{vD}=180$

If the calculated or virtual base pitch is equal to the respective default settings for each and the character spacing command "ESC SP 20" is issued by the applications program to printers C and D, the character spacing to the right of each character printed will be:

Printer C: $20\times(1/160)=1/8$ inch

Printer D: $20\times(1/360)=1/18$ inch

When the following base pitch calculation command "GS P 1440 X" (=don't care) is received by printers C and D, print controllers thereof calculate the conversion coefficient $K_h$ as follows:

$K_{hC}=1/((1/160)*1440)=1/9$ $K_{hD}=1/((1/360)*1440)=1/4$

If the character spacing setting command "ESC SP 180" is received next by both printers, the following relative motion setting are obtained:

Printer C: $n*K_{hC}*P_{hC}=180/(9*160)=1/8$ inch

Printer D: $n*K_{hD}*P_{hD}=180/(4*360)=1/8$ inch

As a result, the character spacing of both printers A and B is $1/8$ inch. Note that $(n\times K_{hC})$ and $(n'K_{hD})$ express the drive pulse count of the carriage drive stepping motor 15.

As has been explained above, a specific control command, a DIP switch setting etc. is used for setting base pitch and based on the thus set base pitch conversion factors are calculated each time a control command is received which instructs a horizontal or vertical relative motion in units of a minimum step size. The command parameter value is then multiplied by the corresponding conversion factor, thereby adapting the command parameter value to the particular printer.

Instead of storing the calculated base pitch setting command parameter values n1 and n2 it is of course also possible to directly calculate the conversion factors $K_h$, $K_v$ from the parameter values n1 and n2 and to store the conversion factors directly instead of the variables n1 and n2. In this alternative, conversion factors $K_h$ and $K_v$ for the horizontal motion and the vertical motion, respectively, are initialized to 1 by the printer. When an calculated base pitch setting command is received it is checked whether the parameter values n1 and n2 are valid or not. If at least one of them is valid, the corresponding conversion factor is calculated and the result stored. If subsequently a control command such as the line spacing command is received, the line spacing is calculated from the stored conversion factor and the command parameter value. While this alternative requires a calculation only once in response to an base pitch command, the first mentioned alternative is preferable because it may reduce calculation errors resulting from rounding.

In the above-described embodiment, the conversion coefficient is first calculated in step 201 and then the relative motion specified by the received motion command is calculated using this conversion coefficient and the minimum pitch associated with the printer. However, it will be appreciated by those ordinarily skilled in the art that the teachings of the present invention is not limited to such a calculation sequence. One may equally calculate the real relative motion by multiplying the base displacement step by a received "n" factor parsed from the motion command, and consequently calculate the number of minimum displacement steps to drive the relevant transport mechanism through dividing the real relative motion amount by the minimum pitch value.

Other motion commands in the control command set processed similarly in the preferred embodiment include: setting the absolute printing position (ESC $), print and feed paper (ESC J), print and reverse feed (ESC K), setting the printing area in page mode (ESC W), setting the relative print position (ESC \), setting the absolute vertical print position in page mode (GS $), setting the left margin (GS L), setting the printing area width (GS W), setting the relative vertical print position in page mode (GS \), setting the left and right side Kanji character spacing (FS S), cutting paper (GS V), and adjusting the print starting position for label printing (GS A).

These commands are related to the paper feed mechanism and the position of the printed characters, and differences in the minimum pitch values of the printer mechanism have conventionally made it necessary to adjust the variables of each command. By implementing the aforementioned printer control techniques of the preferred embodiment, however, it is possible to control the printer without changing the individual variables of these commands, once the base pitch calculation command variable has been set.

More specifically, dependence on the printer mechanism is limited to the minimal processing required to set the base pitch calculation command variable, and once this variable is set all other feed settings can be accomplished in inches or other standard unit of measure.

Furthermore, executing the base pitch calculation command according to the preferred embodiment does not change any other printer settings that have already been defined. The above-noted print and paper feed, print and reverse paper feed, character spacing setting, line feed setting, character position setting, and other related settings are specifically not affected.

When modifying application software developed for different printers, it is also not necessary to modify other printer commands if the program is modified to execute the base pitch calculation command of the present invention during printer initialization.

It is therefore possible by means of the embodiment thus described to virtually standardize in software the various minimum pitch values of different printer mechanisms so that users can develop device drivers and application software using common commands and inches or other standard units of measure.

While the invention has been described in conjunction a specific preferred embodiment, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus, comprising:
    a print head for printing to a recording medium;
    a recording medium transport mechanism including a motor and a feed roller driven by the motor to transport the recording medium in a first direction, according to a first minimum displacement step;
    a carriage on which the Print head is mounted to transport the print head in a second direction intersecting the first direction, according to a second minimum displacement step;
    a print controller for receiving and interpreting print data including pitch and motion commands;
    a base displacement generator in communication with said print controller for generating, in accordance with a pitch command, a first base displacement step defined for said recording medium transport mechanism and a second base displacement step defined for said carriage, said first and second base displacement steps being generated independently from each other;
    a conversion coefficient calculator in communication with said print controller for calculating respective conversion coefficients between the minimum and the corresponding base displacement steps;
    a relative motion translator in communication with said print controller for translating, based on the corresponding conversion coefficient, a uniform motion parameter, which defines a displacement by the corresponding base displacement step specified by the received and interpreted motion command, into a corresponding relative motion parameter which defines the displacement by the corresponding minimum displacement step; and
    a displacement controller in communication with said print controller for controlling said recording medium transport mechanism and said carriage in accordance with the relative motion parameter obtained by the relative motion translator.

2. The printing apparatus of claim 1, wherein the first base displacement step equals or exceeds the first minimum displacement step.

3. The printing apparatus of claim 1, wherein the second base displacement step equals or exceeds the second minimum displacement step.

4. The printing apparatus of claim 3, wherein the first base displacement step equals or exceeds the first minimum displacement step.

5. The printing apparatus of claim 1, wherein the uniform motion parameter is defined in inches.

6. A method for controlling a printing apparatus having a print head for printing to a recording medium and an assembly comprising a recording medium transport mechanism for transporting the recording medium in a first direction, according to a first minimum displacement step, and a carriage for transporting the print head in a second direction intersecting the first direction, according to a second minimum displacement step, the method comprising the steps of:

(a) receiving and interpreting print data including pitch and motion commands;

(b) generating, in accordance with a pitch command, a first base displacement step defined for said recording medium transport mechanism and a second base displacement step defined for said carriage, said first and second base displacement steps being generated independently from each other;

(c) calculating respective conversion coefficients between the minimum and the corresponding base displacement steps;

(d) translating, based on the corresponding conversion coefficient, a uniform motion parameter, which defines a displacement by the corresponding base displacement step specified by the received and interpreted motion command, into a corresponding relative motion parameter which defines the displacement by the corresponding minimum displacement step; and (e) controlling the recording medium transport mechanism and the carriage in accordance with the relative motion parameter obtained in step (d).

7. The method of claim 6, wherein the first base displacement step equals or exceeds the first minimum displacement step.

8. The method of claim 6, wherein the second base displacement step equals or exceeds the second minimum displacement step.

9. The method of claim 6, wherein the uniform motion parameter is defined in inches.

10. A printing apparatus, comprising:

a print head for printing to a recording medium;

a recording medium transport mechanism including a motor and a feed roller driven by the motor to transport the recording medium in a first direction, according to a first minimum displacement step;

a carriage on which the print head is mounted to transport the print head in a second direction intersecting the first direction, according to a second minimum displacement step;

a print controller for receiving and interpreting print data including pitch and motion commands; and a computer readable storage medium in communication with said print controller, comprising:

computer readable program code for generating, in accordance with a pitch command, a first base displacement step defined for said recording medium transport mechanism and a second base displacement step defined for said carriage, said first and second base displacement steps being generated independently from each other;

computer readable program code for calculating respective conversion coefficients between the minimum and the corresponding base displacement steps; computer readable program code for translating, based on the corresponding conversion coefficient, a uniform motion parameter, which defines a displacement by the corresponding base displacement step specified by the received and interpreted motion command, into a corresponding relative motion parameter which defines the displacement by the corresponding minimum displacement step; and computer readable program code for controlling said recording medium transport mechanism and said carriage in accordance with the relative motion parameter.

11. The printing apparatus of claim 10, wherein said storage medium comprises a Read Only Memory (ROM).

12. The printing apparatus of claim 10, wherein the uniform motion parameter is defined in inches.

13. A printing apparatus, comprising:

a print head for printing to a recording medium;

a recording medium transport mechanism including a motor and a feed roller driven by the motor to transport the recording medium in a first direction, according to a first minimum displacement step, a carriage on which the Print head is mounted to transport the print head in a second direction intersecting the first direction, according to a second minimum displacement step;

a print controller for receiving and interpreting print data including pitch and motion commands;

a base displacement generator in communication with said print controller for generating, in accordance with a pitch command, a first base displacement step defined for said recording medium transport mechanism and a second base displacement step defined for said carriage, said first and second base displacement steps being generated independently from each other;

means in communication with said print controller for calculating a relative motion parameter, which defines the displacement by the corresponding minimum displacement step, based on a uniform motion parameter, which defines a displacement by the corresponding base displacement step, specified by the received and interpreted motion command, the corresponding minimum displacement step and the corresponding base displacement step; and a displacement controller in communication with said print controller for controlling said recording medium transport mechanism and said carriage in accordance with the relative motion parameter obtained by the calculating means.

* * * * *

UNITED STATES PATENT AND TRADEMARK OFFICE
CERTIFICATE OF CORRECTION

PATENT NO.   : 5,918,991
DATED        : July 06, 1999
INVENTOR(S)  : Tomomi Miyasaka It is certified that errors appear in the above identified patent and that said Letters Patent is hereby corrected as shown below:

Column 8, line 32, change "Print" to --print--.

Column 10, line 31, change "step," to --step;--.

line 32, change "Print" to --print--.

line 51, delete "," after "step".

Signed and Sealed this

Twenty-first Day of December, 1999

Attest:

Q. TODD DICKINSON

*Attesting Officer*      *Acting Commissioner of Patents and Trademarks*